United States Patent
Drzymala

(10) Patent No.: US 8,146,824 B2
(45) Date of Patent: Apr. 3, 2012

(54) FLOATING TRIGGER ASSEMBLY IN ELECTRO-OPTICAL READER

(75) Inventor: Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 682 days.

(21) Appl. No.: 12/150,517

(22) Filed: Apr. 29, 2008

(65) Prior Publication Data

US 2009/0266897 A1      Oct. 29, 2009

(51) Int. Cl.
*G06K 7/10*      (2006.01)
(52) U.S. Cl. .................................................. 235/462.48
(58) Field of Classification Search .............. 235/462.48
See application file for complete search history.

(56) References Cited

U.S. PATENT DOCUMENTS

| | | |
|---|---|---|
| 4,613,895 A | 9/1986 | Burkey et al. |
| 4,794,239 A | 12/1988 | Allais |
| 5,005,125 A | 4/1991 | Farrar et al. |
| 5,234,394 A | 8/1993 | Wilkinson |
| 5,304,786 A | 4/1994 | Pavlidis et al. |
| 5,541,397 A * | 7/1996 | Walts .......................... 235/462.48 |
| 5,703,349 A | 12/1997 | Meyerson et al. |
| 6,158,662 A | 12/2000 | Kahn et al. |
| 6,415,982 B2 | 7/2002 | Bridgelall et al. |
| 7,321,357 B1 * | 1/2008 | Monney ......................... 345/156 |
| 2006/0255151 A1 * | 11/2006 | Tien ........................... 235/462.48 |

FOREIGN PATENT DOCUMENTS

EP          0355355          1/1994

* cited by examiner

*Primary Examiner* — Jamara Franklin
(74) *Attorney, Agent, or Firm* — Nongqiang Fan

(57) ABSTRACT

A floating trigger assembly is mounted on a housing of an ergonomically triggered reader for electro-optically reading a target to initiate the reading when manually actuated by an operator. The trigger assembly includes a trigger support in the housing, and a floating trigger engageable by the operator exteriorly of the housing and mounted for initial translatory motion toward the trigger support upon initial actuation by the operator, and for turning motion about an axis after the floating trigger contacts the trigger support.

16 Claims, 3 Drawing Sheets

FLOATING TRIGGER ASSEMBLY IN ELECTRO-OPTICAL READER

DESCRIPTION OF THE RELATED ART

Solid-state imaging systems or imaging readers, as well as moving laser beam readers or laser scanners, have both been used to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes a solid-state imager or sensor having an array of cells or photosensors, which correspond to image elements or pixels in a field of view of the imager, and an imaging lens assembly for capturing return light scattered and/or reflected from the symbol being imaged. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Laser beam readers generally include a laser for emitting a laser beam, a focusing lens assembly for focusing the laser beam to form a beam spot having a certain size at a predetermined working distance, a scan component for repetitively scanning the beam spot across a target symbol in a scan pattern, for example, a line or a series of lines across the target symbol, a photodetector for detecting light reflected and/or scattered from the symbol and for converting the detected light into an analog electrical signal, and signal processing circuitry including a digitizer for digitizing the analog signal, and a microprocessor for decoding the digitized signal based upon a specific symbology used for the symbol.

In both types of readers, it is conventional to initiate reading by manually actuating a trigger assembly mounted on the respective reader. In a reader having a gun-shaped housing held by a handle in an operator's hand, a trigger is typically located on the handle at a location that normally lies underneath one or more fingers of the operator's hand in a handheld mode of operation to enable the operator to physically pull and displace the trigger to initiate the reading function, as well as other functions, of the reader. The other functions may include, by way of non-limiting example, aiming the housing at the target prior to reading by generating an aiming light pattern, electronic article surveillance (EAS) tag deactivation before or after the reading has been performed by generating a tag deactivating signal, radio frequency identification (RFID) tag deactivation before or after the reading has been performed by generating a tag deactivating signal, transferring data generated by the reader relating to the target to a remote host after the reading has been performed, or operating a peripheral (e.g., a printer, a communication and/or a display device) after the reading has been performed, etc., U.S. Pat. No. 5,005,125 and European Patent No. 0355355 describe EAS systems and tags, and their method of deactivation. RFID tags are described in U.S. Pat. No. 4,739,328.

As described in U.S. Pat. No. 6,158,662, a single trigger switch of a trigger assembly has been used to activate one or more different functions. For example, the manual depression of a single momentary action switch from a first to a second position has been used to actuate a function. This switch need not, and typically is not, held in the second position to execute the function. The manual release of the switch does not perform any function. Also, the manual depression of the single trigger switch from the first to the second position has been used to actuate a first function, e.g., aiming. Thereupon, the manual release of the trigger switch has been used to actuate a second function, e.g., scanning and reading.

A two-position single trigger switch or dual discrete trigger switches of a trigger assembly were also described in U.S. Pat. No. 6,158,662, as well as in U.S. Pat. No. 5,234,394 and U.S. Pat. No. 6,415,982, to initiate different functions. Such dual trigger switches were actuated by one finger or different fingers, and were independently operable and, hence, either one could be operated before, after, or simultaneously with, the other.

As advantageous as these known trigger assemblies have been, they have proven to be ergonomically uncomfortable to actuate in practice. Each trigger is a rigid lever that pivots around a fulcrum or hard pivot to actuate a trigger switch. In the case of a two-position trigger assembly, the trigger is a rigid rocker that pivots or toggles between its two positions, again around a hard pivot. The hard pivot only permits the trigger to turn or rotate. This constraint in movement has not proven to have a nice feel and, as a result, it is thought to have reduced productivity by increasing operator fatigue and discomfort.

SUMMARY OF THE INVENTION

One feature of this invention resides, briefly stated, in an ergonomically triggered reader for electro-optically reading a target, such as one- and/or two-dimensional bar code symbols, as well as non-symbols. The reader includes a housing, and an actuatable trigger assembly mounted on the housing for initiating the reading when manually actuated by an operator. The trigger assembly includes a trigger support in the housing, and a floating trigger engageable by the operator exteriorly of the housing. The floating trigger is mounted for initial translatory motion toward the trigger support upon initial actuation by the operator, and for turning motion about an axis after the floating trigger contacts the trigger support. The initial translatory motion imparts a "floating or soft" pivot to the assembly and essentially allows the pivot to float or travel unconstrained for a time until the trigger contacts the trigger support. The floating trigger has a nice ergonomic feel and will increase productivity by decreasing operator fatigue and discomfort In a preferred embodiment, the housing has a handle held by the operator during the reading, and the trigger assembly is mounted on the handle. In the case of a moving beam reader, a scanner is provided in the housing for sweeping light across the target for reflection therefrom, and the floating trigger is manually displaced by the operator to initiate the reading by capturing reflected light from the target. In the case of an imaging reader, a solid-state imager, such as a CCD or a CMOS array, is provided in the housing for capturing light from the target, and the floating trigger is manually displaced by the operator to initiate the reading by capturing the light from the target.

In the preferred embodiment, the floating trigger has a trigger portion, e.g., a shaft, extending along the axis. The shaft moves generally linearly radially of the axis toward the trigger support during the initial translatory motion, and the shaft turns circumferentially about the axis during the turning motion. The floating trigger has an initial position in which the shaft is spaced away from, and out of contact with, the trigger support, and a subsequent position in which the shaft contacts the trigger support. The trigger assembly includes a restoring element, e.g., a spring, for constantly urging the floating trigger back to the initial position. The floating trigger advantageously has a pair of forwardly-facing recesses for receiving fingers of the operator's hand, and the shaft is located rearwardly on the floating trigger at an elevation between the recesses.

The trigger assembly further includes a pair of trigger switches, one of the trigger switches being operative to initiate the reading, the other of the trigger switches being operative to initiate another function of the reader, e.g., aiming the housing at the target prior to reading by generating an aiming light pattern, EAS tag deactivation before or after the reading has been performed by generating a tag deactivating signal, RFID tag deactivation before or after the reading has been performed by generating a tag deactivating signal, transferring data generated by the reader relating to the target to a remote host after the reading has been performed, or operating a peripheral (e.g., a printer, a communication and/or a display device) after the reading has been performed. The floating trigger actuates one of the trigger switches when one of the fingers in one of the recesses pivots the floating trigger in one circumferential direction about the axis during the turning motion, and the floating trigger actuates the other of the trigger switches when another of the fingers in the other of the recesses pivots the floating trigger in an opposite circumferential direction about the axis during the turning motion. The trigger assembly includes a printed circuit board on which the trigger switches are mounted, and the trigger support is a plate overlying the printed circuit board and having cutouts in which the trigger switches are received.

Another feature of this invention resides, briefly stated, in a method of ergonomically triggering a reader for electro-optically reading a target, performed by mounting an actuatable trigger assembly on a housing, configuring the trigger assembly to include a trigger support in the housing, configuring a floating trigger exteriorly of the housing, and by initiating the reading by manually actuating the trigger assembly by an operator engaging and moving the floating trigger for initial translatory motion toward the trigger support upon initial actuation by the operator, and for turning motion about an axis after the floating trigger contacts the trigger support.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
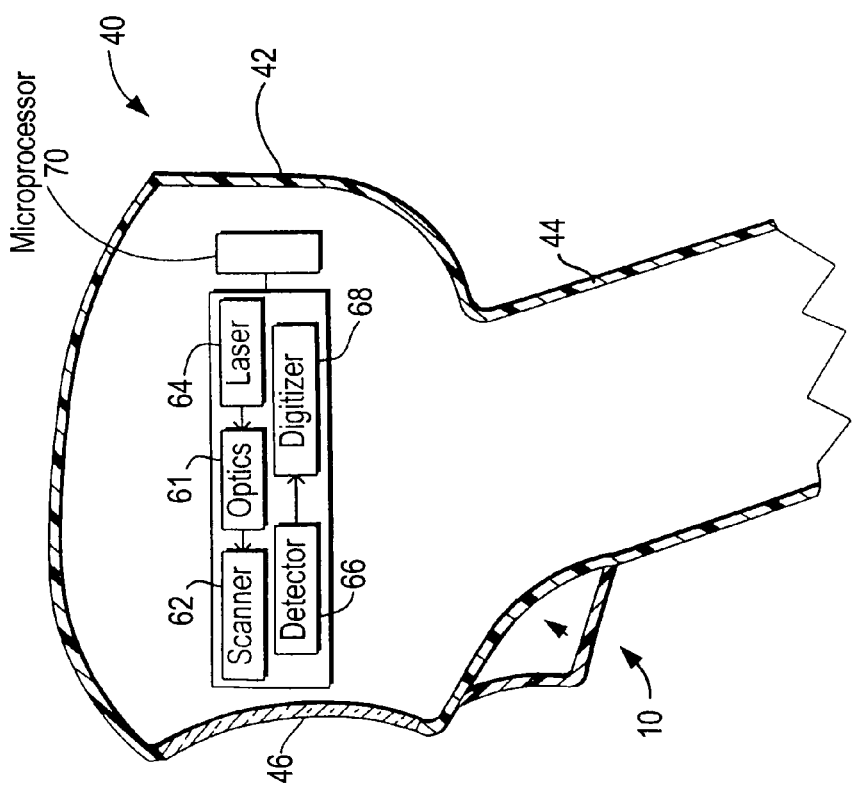
FIG. 1 is a schematic diagram of a handheld moving laser beam reader for electro-optically reading a target in accordance with the prior art.

FIG. 1 depicts a conventional moving laser beam reader 40 for electro-optically reading a target or indicia, such as a symbol, that may use, and benefit from, the present invention. The beam reader 40 includes a scanner 62 in a handheld housing 42 having a handle 44 on which a trigger assembly 10 for initiating reading is mounted. The scanner 62 is operative for scanning an outgoing laser beam from a laser 64 and/or a field of view of a light detector or photodiode 66 in a scan pattern, typically comprised of one or more scan lines, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

Figure 2:
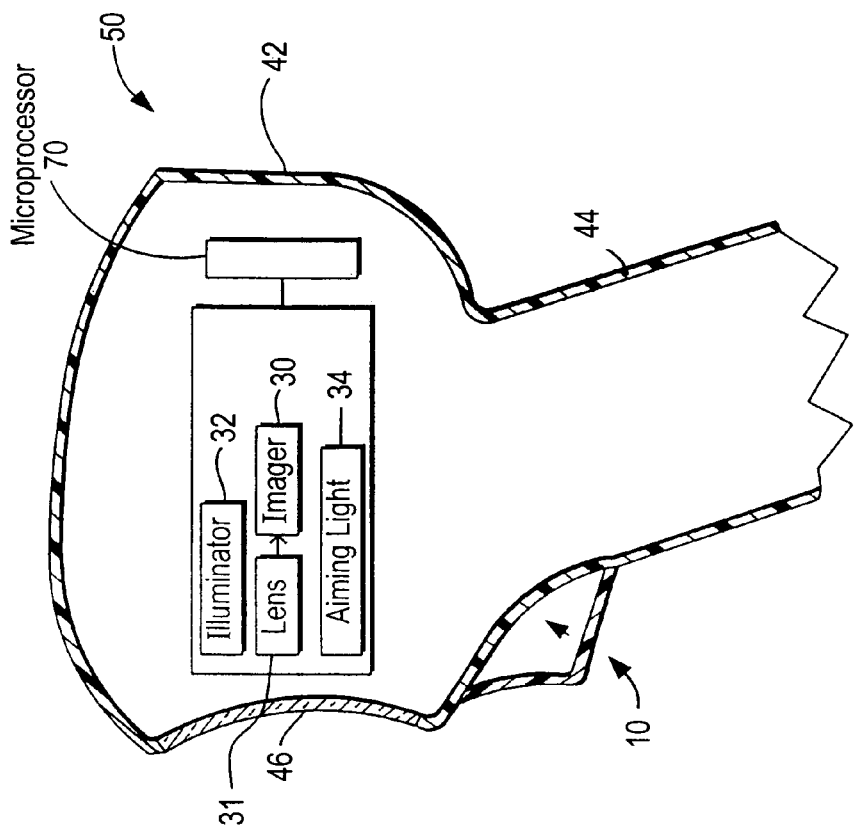
FIG. 2 is a schematic diagram of a handheld imaging reader for electro-optically reading a target in accordance with the prior art.

FIG. 2 depicts a conventional imaging reader 50 for imaging targets, such as indicia or symbols to be electro-optically read, as well as non-symbols, which may use, and benefit from, the present invention. The imaging reader 50 includes a one- or two-dimensional, solid-state imager 30, preferably a CCD or a CMOS array, mounted in the handheld housing 42 having the handle 44 on which the trigger assembly 10 for initiating reading is mounted. The imager 30 has an array of image sensors operative, together with an imaging lens assembly 31, for capturing return light reflected and/or scattered from the target through the window 46 during the imaging to produce an electrical signal indicative of a captured image for subsequent decoding by the controller 70 into data indicative of the symbol being read, or into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light generator 34 may also be provided for projecting an aiming light pattern or mark on the target prior to imaging.

In operation of the imaging reader 50, the controller 70 sends a command signal to pulse the illuminator LEDs 32 for a short time period, say 500 microseconds or less, and energizes the imager 30 during an exposure time period of a frame to collect light from the target during said time period. A typical array needs about 33 milliseconds to read the entire target image and operates at a frame rate of about 30 frames per second. The array may have on the order of one million addressable image sensors.

Figure 3:
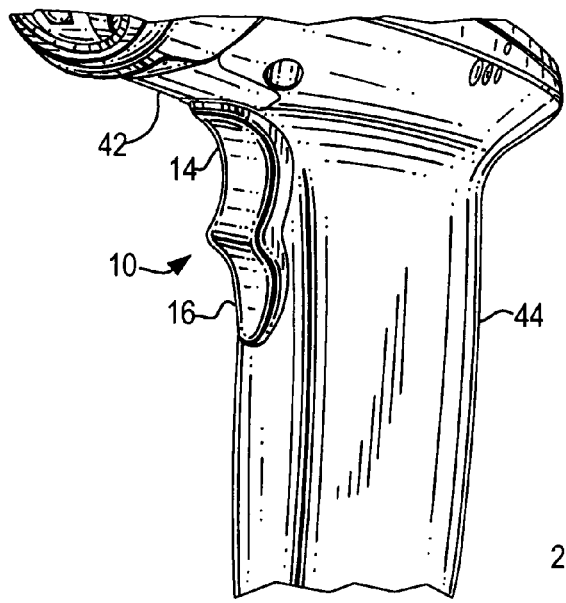
FIG. 3 is a broken-away, perspective view of the reader of FIG. 1 or FIG. 2 depicting a trigger assembly in accordance with the prior art.
Figure 4:
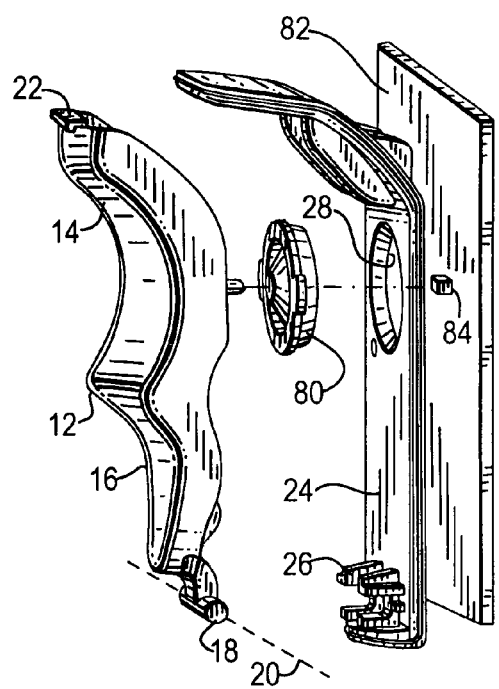
FIG. 4 is an exploded perspective view of the trigger assembly of FIG. 3 in accordance with the prior art.
Figure 5:
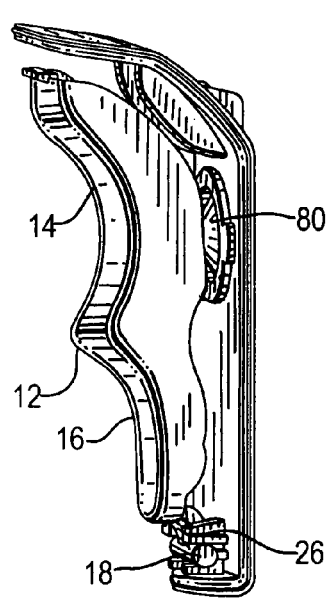
FIG. 5 is an assembled perspective view of the trigger assembly of FIG. 4 in accordance with the prior art.

Turning to FIG. 3, the known trigger assembly 10 is shown at an upper location of the handle 44 of reader 40 or 50. As shown in FIGS. 4-5, the known trigger assembly 10 includes a manually displaceable trigger 12 having a pair of forwardly-facing recesses 14, 16 for receiving fingers of an operator's hand. The trigger 12 is integrally formed with a pivot rod or shaft 18 extending along a pivot axis 20. The trigger 12 is also integrally formed with a lip 22 fitted within the housing 44 to prevent the trigger 12 from falling out of the housing. The trigger 12, the shaft 18 and the lip 22 are preferably of one-piece molded construction.

The known trigger assembly 10 further includes a trigger support 24 mounted in the housing and having an integral fixed bearing 26 in which the shaft 18 is journaled with a snap-type fit for pivoting movement about the axis 20. The trigger support 24 and the fixed bearing 26 are preferably of one-piece molded construction. The snap-type fit also prevents the trigger 12 from falling out of the housing 44. The trigger support 24 has a cutout 28 in which a restoring element or spring 80 is received. The known trigger assembly 10 also includes a printed circuit board 82 (shown only in FIG. 4) on which a trigger switch 84 is mounted underneath the spring 80 in the cutout 28.

As best seen in the assembled view of FIG. 5, the trigger 12 is a rigid lever that pivots in the fixed bearing 26 from an initial position against the force of the restoring spring 80 to a final position in which the trigger switch 84 is actuated and depressed in response to a pulling motion exerted by the operator whose finger or fingers may be in one or both recesses 14, 16. Upon release of the trigger 12, the spring 80 returns the trigger to its initial position. The fixed bearing 26 only permits the trigger 12 to pivot around the axis 20. As described above, this constraint in movement has not proven to have a nice feel and, as a result, it is thought to have reduced reader productivity by increasing operator fatigue and discomfort.

Figure 6:
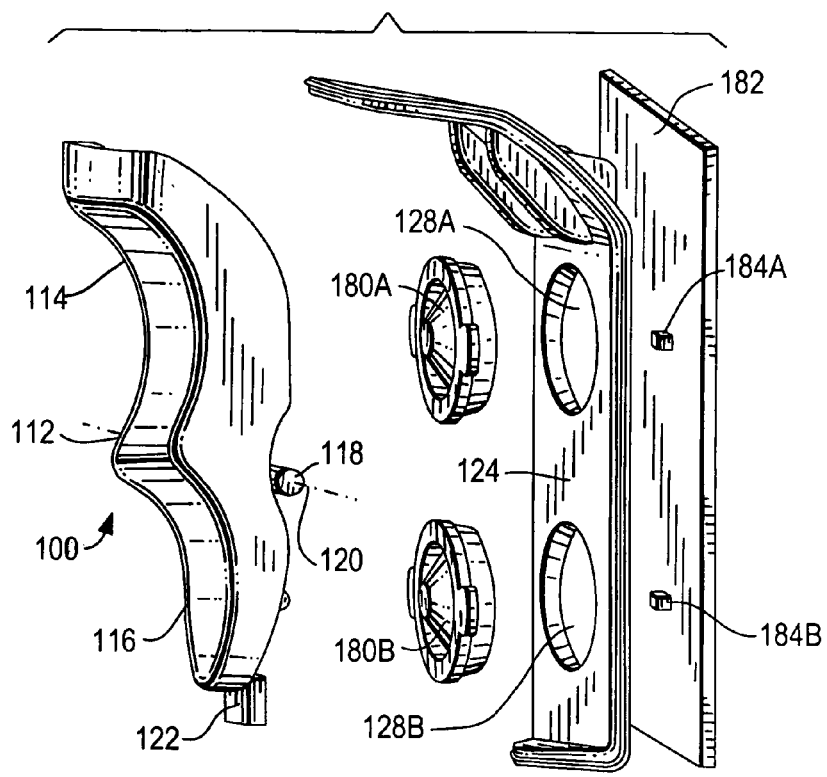
FIG. 6 is an exploded perspective view of a trigger assembly in accordance with the present invention.
Figure 7:
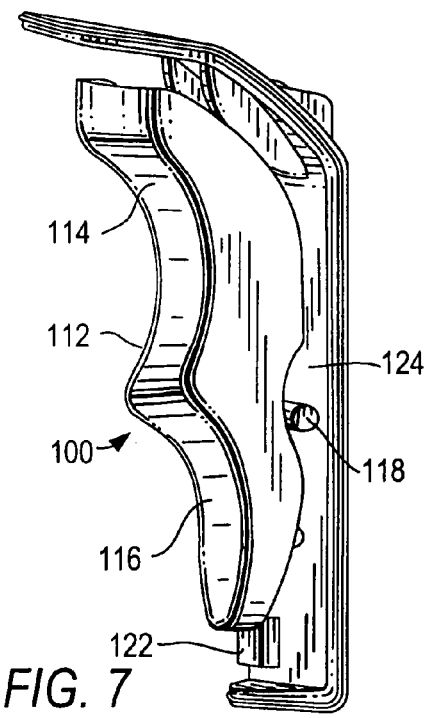
FIG. 7 is an assembled perspective view of the trigger assembly of FIG. 6 in accordance with the present invention.
Figure 8:
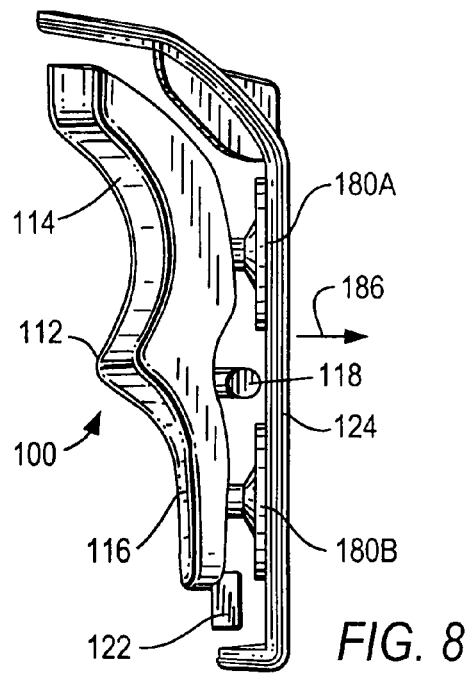
FIG. 8 is an assembled side elevational view of the trigger assembly of FIG. 7 in accordance with the present invention.

In accordance with the present invention, as shown in FIGS. 6-8, an actuatable trigger assembly 100 is mounted on the housing 44 of either reader 40 or 50 for initiating the reading when manually actuated by the operator. The trigger assembly 100 includes a trigger support 124 in the housing 44, and a floating trigger 112 engageable by the operator exteriorly of the housing 44. The floating trigger 112 has a pair of forwardly-facing recesses 114, 116 for receiving fingers of the operator's hand. The floating trigger 112 is integrally formed with a trigger portion, e.g., a shaft 118, extending along an axis 120. The shaft 118 is located rearwardly on the floating trigger 112 at an elevation between the recesses 114, 116. The floating trigger 112 is also integrally formed with a lip 122 fitted within the housing 44 to prevent the floating trigger 112 from falling out of the housing. The floating trigger 112, the shaft 118 and the lip 122 are preferably of one-piece molded plastic construction.

The trigger support 124 includes a plate portion having cutouts 128A, 128B extending therethrough. Restoring elements, e.g., springs 180A, 180B, are received in the cutouts 128A, 128B for constantly urging the floating trigger 112 back to its initial unstressed position. The trigger assembly includes a planar printed circuit board 182 (see FIG. 6) on which two trigger switches 184A, 184B are mounted. The plate portion overlies the printed circuit board 182, and the trigger switches 184A, 184B are received in the cutouts 128A, 128B underneath the springs 180A, 180B. One of the trigger switches 184A, 184B is operative to initiate the reading, and the other of the trigger switches 184A, 184B is operative to initiate another function of the reader, e.g., aiming the housing at the target prior to reading by generating an aiming light pattern, EAS tag deactivation before or after the reading has been performed by generating a tag deactivating signal, RFID tag deactivation before or after the reading has been performed by generating a tag deactivating signal, transferring data generated by the reader relating to the target to a remote host after the reading has been performed, or operating a peripheral (e.g., a printer, a communication and/or a display device) after the reading has been performed.

As shown in FIG. 8, the floating trigger 112 has an initial position in which the shaft 118 is spaced away from, and out of contact with, the plate portion of the trigger support 124. In contrast to the prior art, the shaft 118 it not mounted in a fixed bearing. When one or more of the operator's fingers in one or both of the recesses 114, 116 exerts a pulling force on the floating trigger 112 in a direction generally towards the plate portion of the trigger support 124 and the printed circuit board 182, then the floating trigger 112 and the shaft 118 freely and jointly initially move without mechanical interference with a translatory motion in a direction generally linearly radially of the axis 120 towards the plate portion of the trigger support 124 and the printed circuit board 182. The direction of this initial translatory motion is generally perpendicular to the plane of the board 182, and is indicated by the arrow 186 in FIG. 8.

Upon continued exertion of the pulling force, the shaft 118 eventually contacts the plate portion of the trigger support 124 in a subsequent position. Now, the floating trigger 112 is free to turn about the axis 120. If the operator's finger is in recess 114, then such continued exertion on the floating trigger 112 pivots the floating trigger 112 in a clockwise circumferential direction about the axis 120 against the restoring force of the spring 180A and actuates the trigger switch 184A. If the operator's finger is in recess 116, then such continued exertion on the floating trigger 112 pivots the floating trigger 112 in a counterclockwise circumferential direction about the axis 120 against the restoring force of the spring 180B and actuates the trigger switch 184B. Upon release of the floating trigger 112, the springs 180A, 180B return the floating trigger 112 back to its initial position.

The initial translatory motion imparts a "floating or soft" pivot to the floating trigger assembly 100 and essentially allows the shaft 118 to float or travel unconstrained for a time until the shaft 118 contacts the trigger support 124. The shaft or trigger portion need not be a cylindrical post as illustrated, but could have any shape. After such contact is made, the floating trigger 112 pivots in either circumferential direction to actuate either trigger switch. The floating trigger 112 does not rotate immediately as in the prior art, has a nice ergonomic feel and will increase productivity by decreasing operator fatigue and discomfort.

It will be understood that each of the elements described above, or two or more together, also may find a useful application in other types of constructions differing from the types described above. For example, the floating trigger assembly 100 need not actuate two or more trigger switches 184A, 184B, but could actuate only one trigger switch. Also, the springs 180A, 180B need not be overmolded silicone springs as illustrated, but could be helical springs or cantilevered beams.

While the invention has been illustrated and described as embodied in ergonomically triggered electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An ergonomically triggered reader for electro-optically reading a target barcode, comprising:
    a housing;
    an actuatable trigger assembly mounted on the housing for initiating the reading of the target barcode when manually actuated by an operator, the trigger assembly including a trigger support in the housing, and a floating trigger engageable by the operator exteriorly of the housing and mounted for initial translatory motion toward the trigger support upon initial actuation by the operator, and for turning motion about an axis after the floating trigger contacts the trigger support;
    and a scanner in the housing for sweeping light across the target barcode for reflection therefrom; and wherein the floating trigger is manually displaced by the operator to initiate the reading by capturing reflected light from the target barcode.

2. An ergonomically triggered reader for electro-optically reading a target barcode, comprising:
    a housing;
    an actuatable trigger assembly mounted on the housing for initiating the reading of the target barcode when manually actuated by an operator, the trigger assembly including a trigger support in the housing, and a floating trigger engageable by the operator exteriorly of the housing and mounted for initial translatory motion toward the trigger support upon initial actuation by the operator, and for turning motion about an axis after the floating trigger contacts the trigger support;
    wherein the floating trigger has a trigger portion extending along the axis, and wherein the trigger portion moves generally linearly radially of the axis toward the trigger support during the initial translatory motion, and wherein the trigger portion turns circumferentially about the axis during the turning motion; and
    wherein the floating trigger has an initial position in which the trigger portion is spaced away from, and out of contact with, the trigger support, and a subsequent position in which the trigger portion contacts the trigger support.

3. The reader of claim 2, wherein the housing has a handle held by the operator during the reading, and wherein the trigger assembly is mounted on the handle.

4. The reader of claim 2, and an imaging assembly in the housing for capturing light from the target barcode; and wherein the floating trigger is manually displaced by the operator to initiate the reading by capturing the light from the target barcode.

5. The reader of claim 2, wherein the trigger assembly includes a restoring element for constantly urging the floating trigger back to the initial position.

6. An ergonomically triggered reader for electro-optically reading a target barcode, comprising:
    a housing;
    an actuatable trigger assembly mounted on the housing for initiating the reading of the target barcode when manually actuated by an operator, the trigger assembly including a trigger support in the housing, and a floating trigger engageable by the operator exteriorly of the housing and mounted for initial translatory motion toward the trigger support upon initial actuation by the operator, and for turning motion about an axis after the floating trigger contacts the trigger support;
    wherein the floating trigger has a trigger portion extending along the axis, and wherein the trigger portion moves generally linearly radially of the axis toward the trigger support during the initial translatory motion, and wherein the trigger portion turns circumferentially about the axis during the turning motion; and
    wherein the floating trigger has a pair of forwardly facing recesses for receiving fingers of the operator's hand, and wherein the trigger portion is located rearwardly on the floating trigger between the recesses.

7. The reader of claim 6, wherein the trigger assembly includes a pair of trigger switches, one of the trigger switches being operative to initiate the reading, the other of the trigger switches being operative to initiate another function of the reader; and wherein the floating trigger actuates one of the trigger switches when one of the fingers in one of the recesses pivots the floating trigger in one circumferential direction about the axis during the turning motion, and wherein the floating trigger actuates the other of the trigger switches when another of the fingers in the other of the recesses pivots the floating trigger in an opposite circumferential direction about the axis during the turning motion.

8. The reader of claim 7, wherein the trigger assembly includes a printed circuit board on which the trigger switches are mounted, and wherein the trigger support is a plate overlying the printed circuit board and having cutouts in which the trigger switches are received.

9. A method of ergonomically triggering a reader for electro-optically reading a target barcode, comprising the steps of:
    mounting an actuatable trigger assembly on a housing, and configuring the trigger assembly to include a trigger support in the housing, and a floating trigger exteriorly of the housing;
    initiating the reading of the barcode by manually actuating the trigger assembly by an operator engaging and moving the floating trigger for initial translatory motion toward the trigger support upon initial actuation by the operator, and for turning motion about an axis after the floating trigger contacts the trigger support;
    and the steps of sweeping light across the target barcode for reflection therefrom with a scanner in the housing, and manually displacing the floating trigger by the operator to initiate the reading by capturing reflected light from the target barcode.

10. A method of ergonomically triggering a reader for electro-optically reading a target barcode, comprising the steps of:
    mounting an actuatable trigger assembly on a housing, and configuring the trigger assembly to include a trigger support in the housing, and a floating trigger exteriorly of the housing;
    initiating the reading of the barcode by manually actuating the trigger assembly by an operator engaging and moving the floating trigger for initial translatory motion toward the trigger support upon initial actuation by the operator, and for turning motion about an axis after the floating trigger contacts the trigger support;

spacing the trigger portion away from, and out of contact with, the trigger support in an initial position of the floating trigger, and contacting the trigger support with the trigger portion in a subsequent position of the floating trigger;

and the steps of spacing the trigger portion away from, and out of contact with, the trigger support in an initial position of the floating trigger, and contacting the trigger support with the trigger portion in a subsequent position of the floating trigger.

11. The method of claim 10; and the steps of holding the housing with a handle by the operator during the reading, and mounting the trigger assembly on the handle.

12. The method of claim 10; and the steps of capturing light from the target barcode with an imaging assembly in the housing, and manually displacing the floating trigger by the operator to initiate the reading by capturing the light from the target barcode.

13. The method of claim 10; and the step of constantly urging the floating trigger back to the initial position.

14. A method of ergonomically triggering a reader for electro-optically reading a target barcode, comprising the steps of:

mounting an actuatable trigger assembly on a housing, and configuring the trigger assembly to include a trigger support in the housing, and a floating trigger exteriorly of the housing;

initiating the reading of the barcode by manually actuating the trigger assembly by an operator engaging and moving the floating trigger for initial translatory motion toward the trigger support upon initial actuation by the operator, and for turning motion about an axis after the floating trigger contacts the trigger support;

spacing the trigger portion away from, and out of contact with, the trigger support in an initial position of the floating trigger, and contacting the trigger support with the trigger portion in a subsequent position of the floating trigger;

and the steps of configuring the floating trigger with a pair of forwardly-facing recesses for receiving fingers of the operator's hand, and locating the trigger portion rearwardly on the floating trigger between the recesses.

15. The method of claim 14; and the steps of configuring the trigger assembly with a pair of trigger switches, one of the trigger switches being operative to initiate the reading, the other of the trigger switches being operative to initiate another function of the reader; and wherein the actuating step is performed by actuating one of the trigger switches when one of the fingers in one of the recesses pivots the floating trigger in one circumferential direction about the axis during the turning motion, and by actuating the other of the trigger switches when another of the fingers in the other of the recesses pivots the floating trigger in an opposite circumferential direction about the axis during the turning motion.

16. The method of claim 15; and the steps of mounting the trigger switches on a printed circuit board, configuring the trigger support as a plate, overlying the printed circuit board with the plate, forming cutouts in the plate, and receiving the trigger switches in the cutouts.

* * * * *

UNITED STATES PATENT AND TRADEMARK OFFICE
CERTIFICATE OF CORRECTION

PATENT NO.       : 8,146,824 B2  
APPLICATION NO.  : 12/150517  
DATED            : April 3, 2012  
INVENTOR(S)      : Drzymala Page 1 of 1

It is certified that error appears in the above-identified patent and that said Letters Patent is hereby corrected as shown below:

In Column 7, Line 60, in Claim 4, delete "claim 2," and insert -- claim 2; --, therefor.

Signed and Sealed this  
Twenty-fifth Day of December, 2012

David J. Kappos  
*Director of the United States Patent and Trademark Office*